(12) United States Patent
Egawa (10) Patent No.: US 7,787,036 B2
(45) Date of Patent: Aug. 31, 2010

(54) IMAGING APPARATUS CONFIGURED TO CORRECT NOISE

(75) Inventor: Akira Egawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 11/844,852

(22) Filed: Aug. 24, 2007

(65) Prior Publication Data

US 2008/0062292 A1 Mar. 13, 2008

(30) Foreign Application Priority Data

Sep. 7, 2006 (JP) ............... 2006-242926
Sep. 7, 2006 (JP) ............... 2006-242927

(51) Int. Cl.
*H04N 9/64* (2006.01)
(52) U.S. Cl. .............. 348/251; 348/222.1; 348/243
(58) Field of Classification Search ............. 348/222.1, 348/241, 243, 251, 316, 321
See application file for complete search history.

(56) References Cited

U.S. PATENT DOCUMENTS 7,295,238 B2* 11/2007 Tanaka et al. ............... 348/316
7,379,104 B2* 5/2008 Hattori et al. ............... 348/241
2004/0263641 A1* 12/2004 Tsuda ..................... 348/222.1
2006/0098240 A1* 5/2006 Funamoto ................ 358/461
2006/0262207 A1* 11/2006 Matsuoka ................. 348/243

FOREIGN PATENT DOCUMENTS

JP 2006-191449 A 7/2006

* cited by examiner

*Primary Examiner*—Lin Ye
*Assistant Examiner*—Gevell Selby
(74) *Attorney, Agent, or Firm*—Canon U.S.A., Inc. I.P. Division (57) ABSTRACT

An imaging apparatus includes an imaging area having, in a vertical direction, a plurality of lines having a plurality of pixels in a horizontal direction, wherein each of the plurality of lines includes an light-shielded area and an effective pixel area that is not light-shielded, a first correction unit configured to correct a shading component in the vertical direction that is included in an image signal from the effective pixel area of the plurality of lines, according to a first correction signal from the light-shielded area of the plurality of lines, and a second correction unit configured to correct the image signal output from the first correction unit according to a second correction signal obtained by multiplying the first correction signal, which is in the same line as the image signal, by a coefficient for decreasing a signal level of the first correction signal.

1 Claim, 13 Drawing Sheets

FIG. 7A
AVERAGE OF ALL CHANNELS

FIG. 7B
FOR EACH AREA

FIG. 7C
DARK SHADING (LOW FREQUENCY)

FIG. 7D
AVERAGE OF ALL CHANNELS AFTER DARK SHADING CORRECTION

FIG. 7E
FOR EACH AREA AFTER DARK SHADING CORRECTION

FIG. 7F
AVERAGE OF ALL CHANNELS AFTER HORIZONTAL LINE NOISE CORRECTION

FIG. 7G
FOR EACH AREA AFTER HORIZONTAL LINE NOISE CORRECTION

FIG. 13A (PRIOR ART) — OUTPUT AMPLIFIER 74a

FIG. 13B (PRIOR ART) — OUTPUT AMPLIFIER 74b

FIG. 13c (PRIOR ART) — AVERAGE OF OUTPUT AMPLIFIERS 74a AND 74b

IMAGING APPARATUS CONFIGURED TO CORRECT NOISE

BACKGROUND OF THE INVENTION

1. Field of the Invention

The present invention relates to an imaging apparatus configured to pick up an image of an object.

2. Description of the Related Art

In recent years, a conventional imaging apparatus such as a digital single-reflex camera and a video camera uses a complementary metal oxide semiconductor (CMOS) image sensor. A recent CMOS image sensor, similar to a charge-coupled device (CCD) image sensor, has a large number of pixels. Accordingly, a size of each pixel has become smaller as the number of pixels in a CMOS sensor increases, and thus an optical signal gets small. Therefore, it is highly necessary to reduce or suppress a noise, so that a signal to noise (S/N) ratio does not become worse.

Figure 8:
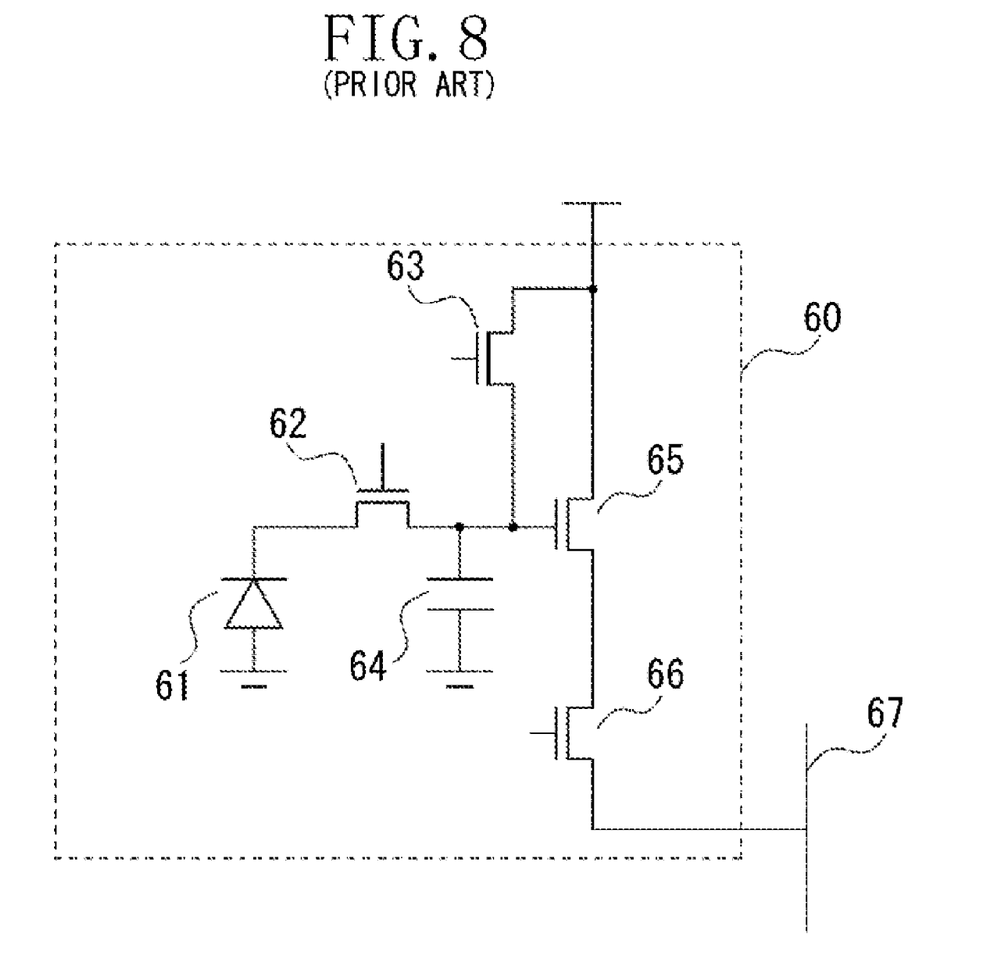
FIG. 8 illustrates a circuit of one pixel of a CMOS image sensor, according to conventional art.

Now, related art will be described below. FIG. 8 illustrates a circuit 60 for one pixel of a CMOS image sensor. In FIG. 8, a photo diode (PD) 61 receives an optical image formed by a photographing lens (not illustrated), generates electrical charge, and accumulates the generated electrical charge. A transfer switch (hereinafter referred to as a "TX") 62 is formed by a metal oxide semiconductor (MOS) transistor. A floating diffusion (FD) 64 is a capacitor. The TX 62 transfers the electrical charge accumulated in the PD 61 to the FD 64. The FD 64 converts the transferred electrical charge into a voltage. The voltage is output from an amplifier 65 via a source follower. A row selection switch 66 sends a pixel output to a vertical output line 67. A reset switch 63 resets a potential in the FD 64.

Figure 9:
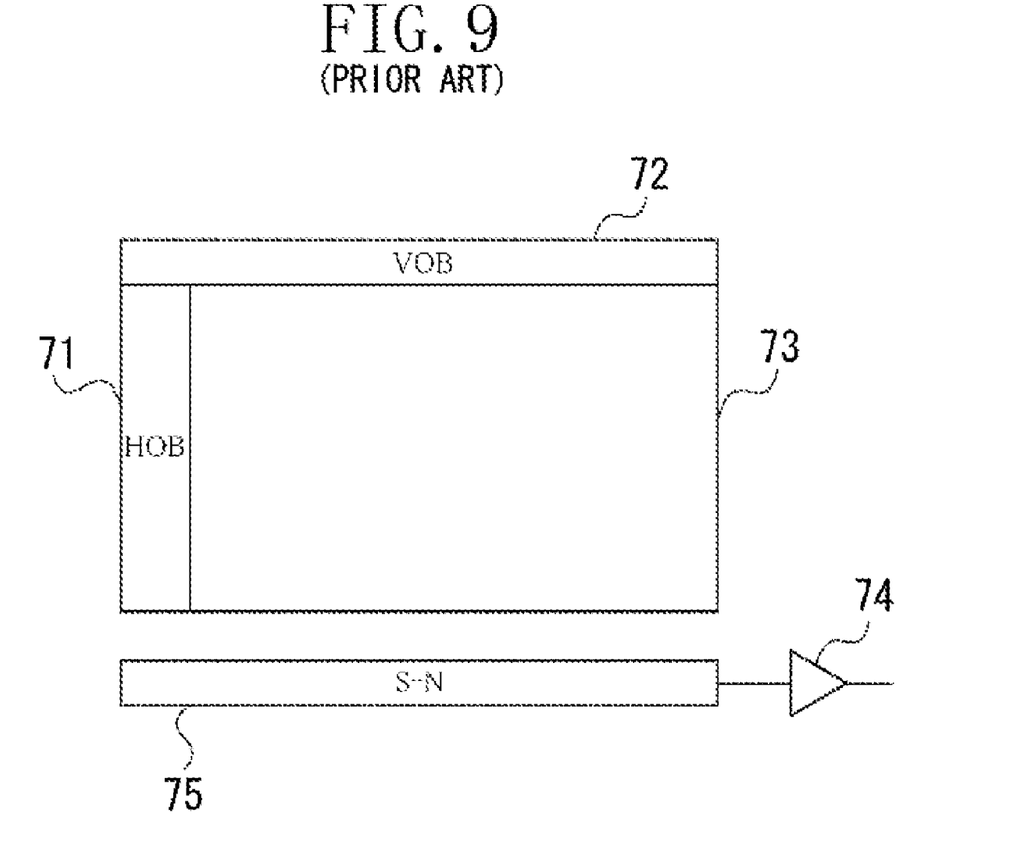
FIG. 9 illustrates a layout of a CMOS image sensor, according to conventional art.

FIG. 9 illustrates a layout of the entire CMOS image sensor. A CMOS image sensor has optical black areas (OB areas) 71 and 72 in its peripheral portions. Each of the OB areas 71 and 72 is formed by an light-shielded pixel. The OB area 72 is a vertical OB area (or a horizontal OB area). The OB area 72, formed by an light-shielded pixel as described above, is used for detecting a black level and for correcting an offset variation of an output caused due to a dark current component or a temperature variation in the CMOS image sensor. The OB area 71 is a horizontal OB area (or a vertical OB area). The OB area 71, also formed by an light-shielded pixel similar to the vertical OB area, is used for correcting a dark shading component in a vertical direction.

A dark shading component can appear due to a dark current shading. However, as a characteristic of a CMOS image sensor, a dark shading component can appear due to a voltage shading that is caused by an impedance on a power line of the CMOS image sensor. In an ordinary case, dark shading correction in the vertical direction is performed on a gentle slope. In addition, a dark shading correction in the vertical direction is performed with a low pass filter on a pixel output from each of a plurality of rows, in order to prevent a defective pixel from causing a defective line.

An image captured via a photographing lens (not illustrated) is formed on an effective pixel area 73. A signal-to-noise (S-N) circuit 75 differentiates a noise signal (N signal) from a signal output from the PD 61 (S signal). The S-N circuit 75 removes a inherent noise component that arises in a CMOS image sensor. With the S-N circuit 75, which removes a noise component as described above, a CMOS image sensor can obtain an S/N ratio at a level equal to a CCD image sensor.

The S-N circuit 75 holds a signal component S and a noise component N for each pixel output on a row selected by the row selection switch 66. Then, the S-N circuit 75 subtracts, with respect to each pixel, the noise component N from the signal component S, using an output amplifier 74. Thus, a pixel signal with no noise component can be output.

A noise component is held as follows. In a state where the TX 62 is OFF, the FD 64 is reset by the reset switch 63 (see FIG. 8) with a pulse. Then, a resulting signal is held in the S-N circuit 75 as an N signal via the amplifier 65, the row selection switch 66, and the vertical output line 67. A noise component can be a reset noise in the FD 64 and a noise occurring due to an inter-pixel unevenness of a voltage between gate sources of the amplifier 65.

A signal component is held as follows. A potential in the PD 61 is converted into a voltage by the FD 64 by turning ON the TX 62 with a pulse. Then, a resulting signal is held in the S-N circuit 75 as an S signal, as in the case of the noise component. The S signal is added to the noise component obtained by resetting the FD 64.

A noise component can be cancelled by subtracting an N signal from an S signal at the time of reading a signal with the output amplifier 74. Then, a correction is performed in order to match a black level of the signal output from the output amplifier 74 with a reference black level. Subsequently, an offset in the horizontal OB area (a difference between the black level in the horizontal OB area and the reference black level) is subtracted. Thus, a high frequency noise can be suppressed. The above-described conventional method is discussed in Japanese Patent Application Laid-Open No. 2006-191449.

However, even if an offset in a horizontal OB area is subtracted as described above, a horizontal noise cannot be cancelled. When a noise source is placed on a power source, a power line of an image sensor or a substrate of an image sensor itself vibrates. More specifically, a signal output from a pixel is affected by a capacity coupling with a substrate of the image sensor and wiring around the image sensor on a grounding side of the FD 64 (FIG. 8). Accordingly, the OB area that is light-shielded and the effective pixel that is not light-shielded are affected differently.

Figure 10:
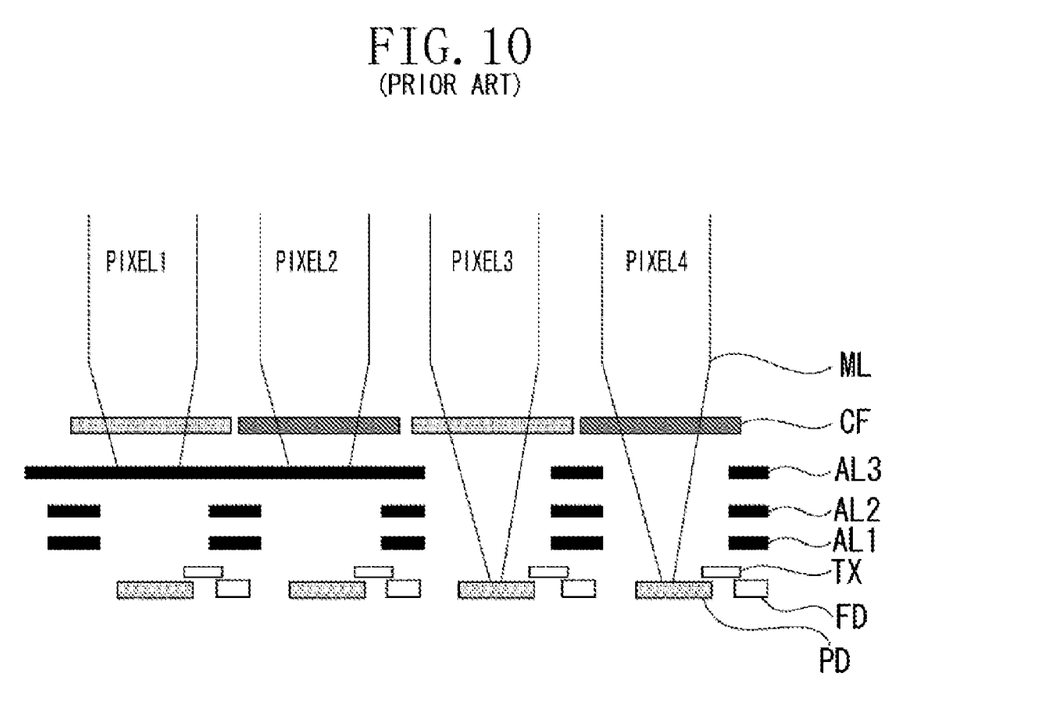
FIG. 10 is a cross section of a CMOS image sensor, according to conventional art.

FIG. 10 is a cross section of a CMOS image sensor. Referring to FIG. 10, each of pixels 1 and 2 is an OB pixel light-shielded by AL3, while pixels 3 and 4 are not light-shielded by AL3. Each of pixels 3 and 4 is not light-shielded, therefore, is an effective pixel. A micro lens (ML) effectively condenses light into the PD 61 through a color filter(CF). The CMOS image sensor further includes wiring layers AL1 to AL3. The wiring layer AL3 also serves to optically shield light. A TX, an FD, and a PD in FIG. 10 are similar to the TX 62, the FD 64, and the FD 64 in FIG. 8. The wiring layer AL3 is more widely provided for a pixel in the OB area than for the effective pixel area. Thus, the capacity coupling with the FD differently affects the pixel in the OB area compared to the effective pixel area.

The degree of susceptibility of the effective pixel area to the noise from the power source or other noises is about 0.4 to 0.8 times that of an OB area according to an experiment. The degree of susceptibility to a noise varies according to the layout of the components of the CMOS image sensor. That is, in the case where the offset in the OB area is subtracted as it is as described above, the noise is overcorrected. Thus, it appears that the horizontal noise cannot be effectively cancelled.

Figure 4A:
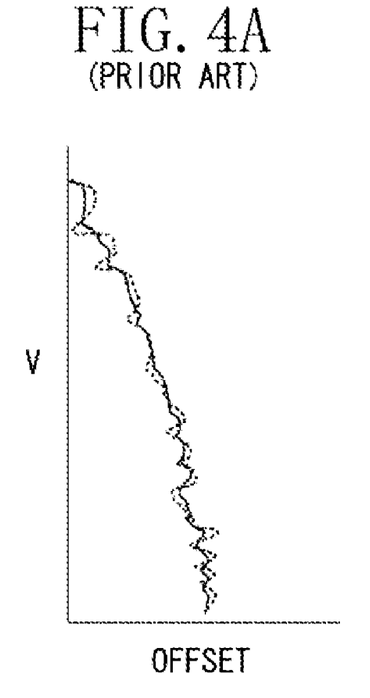
FIGS. 4A through 4C each illustrate dark shading in a vertical direction.
Figure 4B:
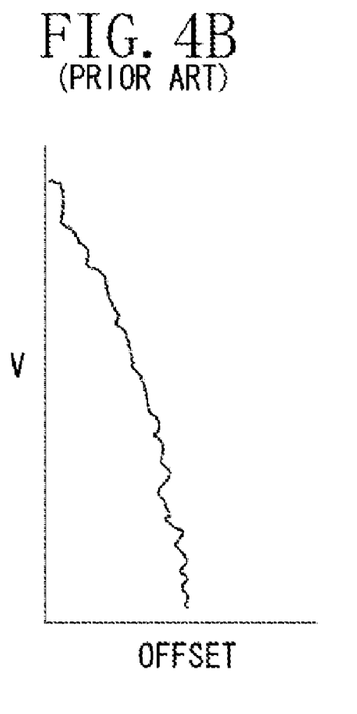
Figure 4C:
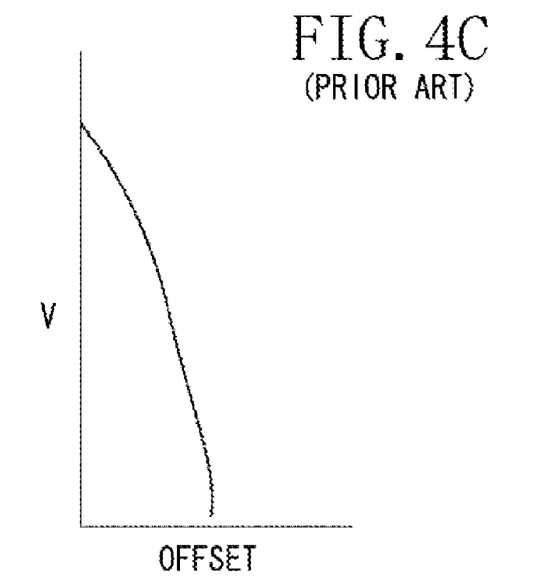

FIGS. 4A through 4C are graphs respectively illustrating a level of offset. In each of FIGS. 4A through 4C, a vertical position on the image sensor is taken on a vertical axis. The offset level of the OB area of an image sensor from a black level is taken on a horizontal axis.

FIG. 4B illustrates a dark shading of an output of an effective pixel area in a vertical (V) direction, in a state where light is not applied. A portion indicating a gently variation corresponds to the dark shading caused by a circuit impedance. A portion indicating a fine variation corresponds to the dark shading caused by the noise from the power source superposed on the FD 64 of the pixel. The noise from the power source is canceled by a horizontal OB clamping of an analog front end (AFE) 2 (FIG. 1), as illustrated in FIG. 4C.

FIG. 4A illustrates dark shading in the V direction of the image sensor. In FIG. 4A, a full-line curve indicates dark shading in the same effective pixel area as that in FIG. 4B, and a broken-line curve indicates dark shading in the OB area. A gentle variation portion of shading is similar between the OB area and the effective pixel area. However, amplitude in a portion of the curve indicating a fine variation is greater in the OB area than in the effective pixel area.

Figure 11:
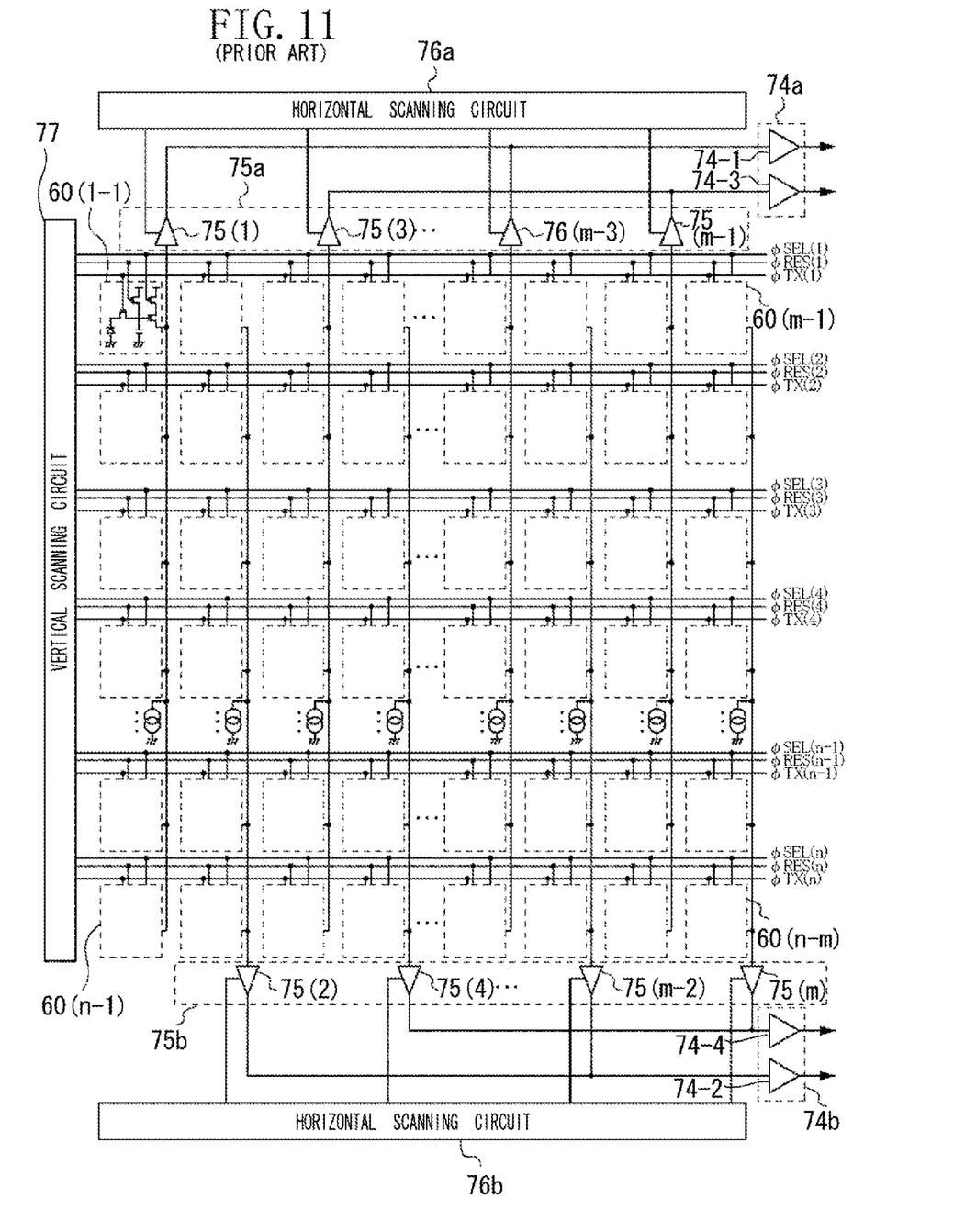
FIG. 11 illustrates an exemplary layout of the entire multi-channel image sensor, according to conventional art.

Next, a second related art will be described below. FIG. 11 illustrates an exemplary layout of an entire multi-channel CMOS image sensor. Unitary pixels described above with reference to FIG. 8 (pixel 60(1-1) through pixel 60(n-m)) are arranged on a matrix. An accumulation of each pixel is controlled according to a signal (a TX 62 control signal φTX, a reset switch 63 control signal φRES, and a row selection switch 66 control signal φSEL) output from a vertical scanning circuit 77.

The vertical output line 67 (67(1) through 67(m)) is connected in common to each vertical pixel. Furthermore, the vertical output line 67 is connected to the S-N circuit 75 (S-N circuits 75(1) through 75(m)) that differentiates a noise signal, from a photoelectric conversion signal from a pixel, per line. A horizontal scanning circuit 76 (76a through 76b) performs control such as selection of an output from the S-N circuit 75 (S-N circuits 75(1) through 75(m)).

The output from the S-N circuit 75 (S-N circuits 75(1) through 75(m)) is then output to a subsequent processing circuit (e.g., an AFE (not illustrated)) via the output amplifier 74 (output amplifiers 74-1 through 74-4).

The CMOS image sensor illustrated in FIG. 11 includes four output amplifiers 74 to simultaneously perform noise correction processing on a plurality of horizontal pixels (in the example in FIG. 11, four pixels), in order to correspond to image taking processing by the imaging apparatus performed at a high speed. Each output amplifier 74 outputs a pixel output separately to each output path. Furthermore, in order to achieve an effective layout of the CMOS image sensor having the above-described configuration, the pixel output is routed via the vertical output line 67, the S-N circuit 75, and the output amplifier 74. Moreover, an output line for odd-numbered column pixels (e.g., pixels in a first column and a third column) of the plurality of horizontal pixels is arranged in an upper portion of the CMOS image sensor. An output line for even-numbered column pixels (e.g., pixels in a second column and a fourth column) of the plurality of horizontal pixels is arranged in a lower portion of the CMOS image sensor.

That is, with respect to a signal output path of the CMOS image sensor, an odd-numbered pixel output is routed via an output path including an S-N circuit block 75a and an output amplifier block 74a in the upper portion of the CMOS image sensor. An even-numbered pixel output is routed via an output path including an S-N circuit block 75b and an output amplifier block 74b in the lower portion of the CMOS image sensor.

As described above, the S-N circuit 75 cancels an inherent noise occurring in a CMOS image sensor to achieve an S/N ratio at a level similar to a CCD image sensor. Further, The S-N circuit 75 holds a signal component S and a noise component N for each pixel output on a row selected by the row selection switch 66. Then, the S-N circuit 75 subtracts the noise component N from the signal component S with respect to each pixel, using the output amplifier 74. Thus, a pixel signal with no noise can be output.

Here, a noise component is obtained in the following manner. In a state where the TX 62 is OFF, the FD 64 is reset by the reset switch 63 with a pulse. Then, a resulting signal is held in the S-N circuit 75 as an N signal via the amplifier 65, the row selection switch 66, and the vertical output line 67. A noise component includes a reset noise in the FD 64 and a noise occurring due to an inter-pixel unevenness of a voltage between gate sources of the amplifier 65.

A signal component is obtained in the following manner. A potential in the PD 61 is converted into a voltage by the FD 64 by turning ON the TX 62 with a pulse. Then, a resulting signal is held in the S-N circuit 75 as an S signal, as in the case of the noise component. The S signal is added to the noise component obtained by resetting the FD 64.

A noise component can be cancelled by subtracting an N signal from an S signal at the time of reading a signal with the output amplifier 74, as discussed in Japanese Patent Application Laid-Open No. 2004-134752. However, a multi-channel image sensor having a plurality of signal output paths has the following problem.

Figure 12:
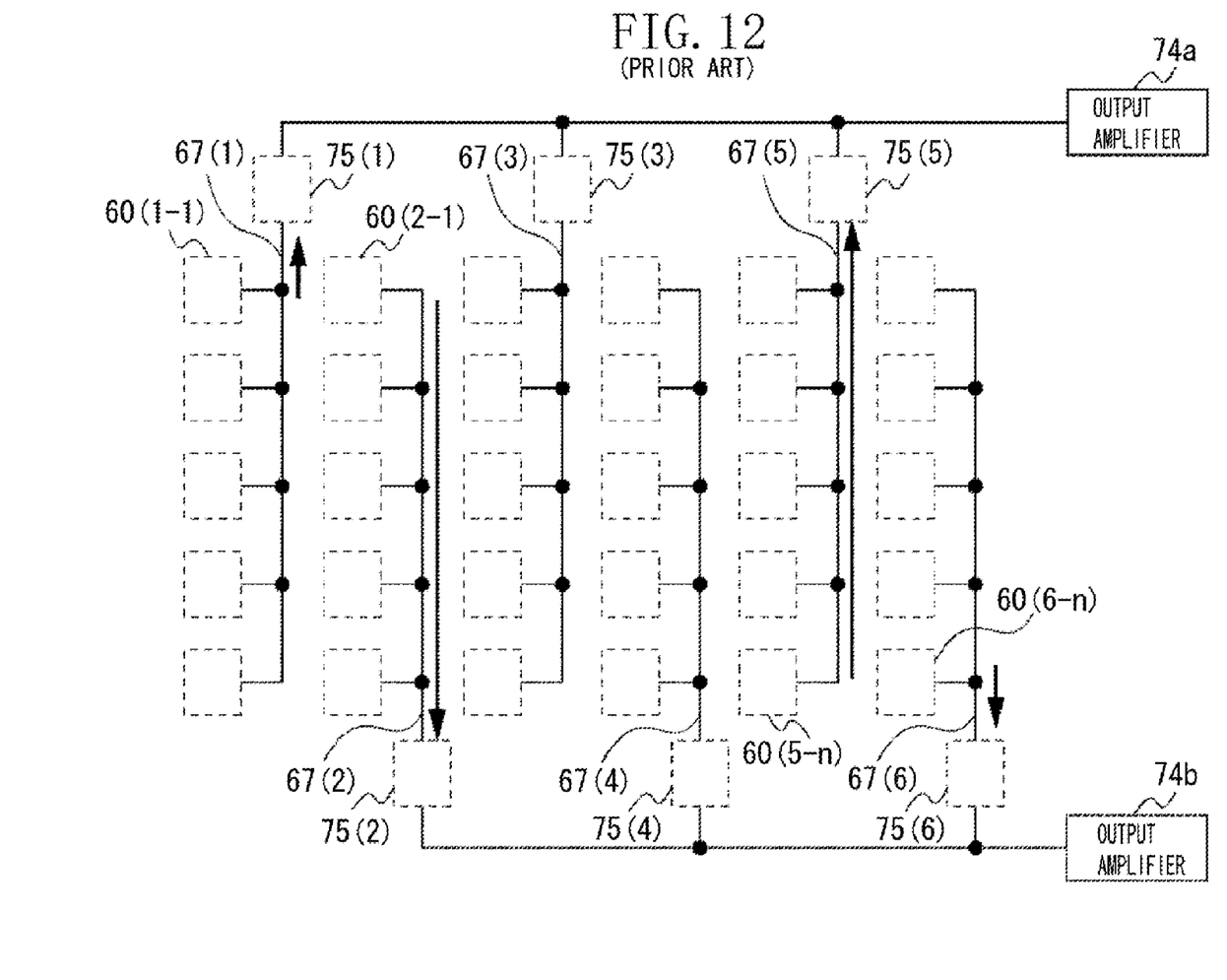
FIG. 12 is a schematic diagram illustrating a wiring resistance (impedance) in an image sensor, according to conventional art.

FIG. 12 illustrates an impedance in the case where a noise appears in a CMOS image sensor. The following is an example of a comparison result between adjacent pixels in the same row and different columns. In FIG. 12, a distance t1 from the pixel 60(1-1) to the S-N circuit 75(1) via the vertical output line 67(1) is smaller than a distance t2 from the pixel 60(2-1) to the S-N circuit 75(2) via the vertical output line 67(2) (that is, t1<t2). Similarly, a distance t3 from the pixel 60(5-n) to the S-N circuit 75(1) via the vertical output line 67(5) is greater than a distance t4 from the pixel 60(6-n) to the S-N circuit 75(2) via the vertical output line 67(6) (that is, t3>t4).

As a signal output path becomes longer, an impedance (wiring resistance) necessarily becomes higher. Accordingly, an influence of an electrical variation caused by a noise become greater.

Figure 13A:
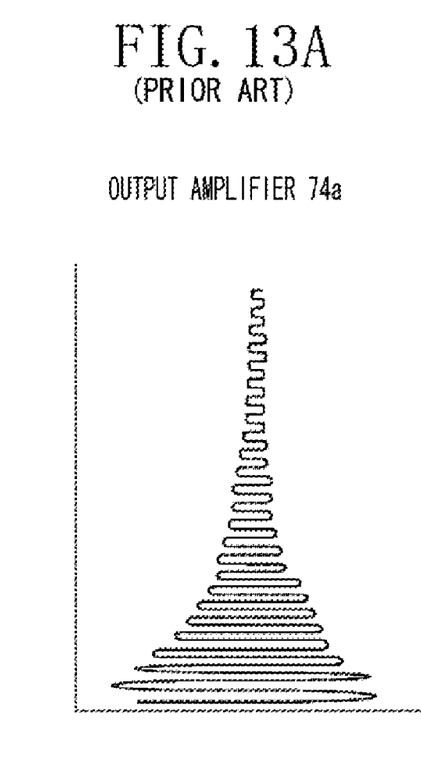
FIGS. 13A through 13C each illustrate dark shading in a vertical direction in the case where a noise is generated, according to conventional art.
Figure 13B:
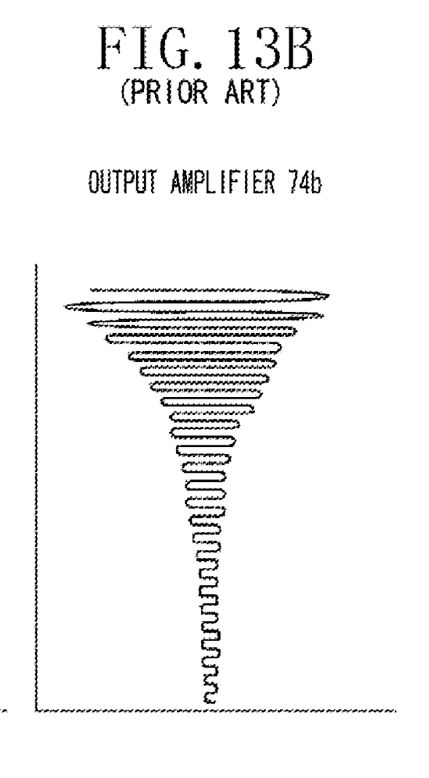
Figure 13C:
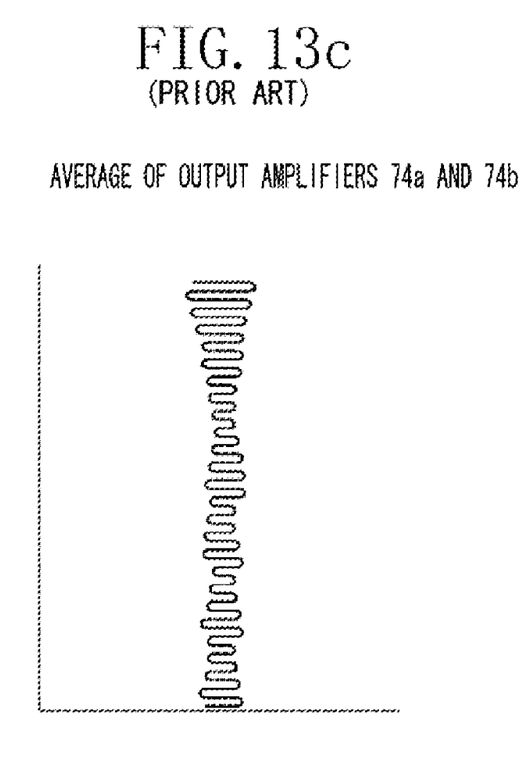

FIGS. 13A through 13C each illustrate shading occurring in the vertical direction per output path, where it is supposed that the entire surface of the CMOS image sensor evenly receives a noise of a predetermined frequency.

FIG. 13A illustrates shading data of the output amplifier block 74a disposed in the upper portion of the CMOS image sensor. Referring to FIG. 13A, the pixel in the upper portion of the CMOS image sensor, which is closer to the S-N circuit 75 (output stage), has a low impedance. Accordingly, a small variation occurs in the upper portion. The pixel in the lower portion of the CMOS image sensor, which is distant from the S-N circuit 75 (output stage), has higher impedance. The greater the distance between a pixel and the S-N circuit 75 (output stage), the greater the impedance. Accordingly, a great variation occurs in the lower portion.

On the other hand, FIG. 13B illustrates shading data of the output amplifier block 74b disposed in the lower portion of the CMOS image sensor. Referring to FIG. 13B, the pixel in the upper portion of the CMOS image sensor, which is distant from the S-N circuit 75 (output stage), has higher impedance. Accordingly, a great variation occurs in the upper portion. The pixel in the lower portion of the CMOS image sensor, which is closer to the S-N circuit 75 (output stage), has lower impedance. Here, the smaller the distance between a pixel and the S-N circuit 75 (output stage), the lower the impedance. Accordingly, a small variation occurs in the lower portion.

FIG. 13C illustrates shading data obtained according to an average value of pixel outputs from the output amplifier block 74a and the output amplifier block 74b (that is, data obtained according to an average value of outputs from a predetermined area, which is generally used for generating correction data). In this case, the outputs are averaged, and thus the effects from the noise are substantially even in the entire upper and lower portions of the CMOS image sensor. If a noise correction is performed based on the shading data in FIG. 13C, an uncorrected noise remains in the output from the output amplifier block 74a in the upper portion, and an uncorrected noise remains in the output from the output amplifier block 74b in the lower portion. Furthermore, a portion having less noise may be overcorrected.

That is, due to a difference in the distance from a position of a noise source and the difference in the length of the wiring of a CMOS image sensor, the impedance levels up to the output, of pixels in the same row, differ. As a result, the levels of noise differ in the different pixels in the same row. However, if all pixel outputs are corrected with the same correction value (correction data), a right amount of correction is not achieved. The correction amount can be too great or too small.

SUMMARY OF THE INVENTION

The present invention is directed to an imaging apparatus capable of effectively canceling a noise that affects an image sensor.

According to an aspect of the present invention, an imaging apparatus includes an imaging area having, in a vertical direction, a plurality of lines having a plurality of pixels in a horizontal direction, wherein each of the plurality of lines includes an light-shielded area and an effective pixel area that is not light-shielded; a first correction unit configured to correct a shading component in the vertical direction that is included in an image signal from the effective pixel area of the plurality of lines, according to a first correction signal from the light-shielded area of the plurality of lines; and a second correction unit configured to correct the image signal output from the first correction unit according to a second correction signal obtained by multiplying the first correction signal, which is in the same line as the image signal, by a coefficient for decreasing a signal level of the first correction signal.

According to another aspect of the present invention, an imaging apparatus includes an imaging area having, in a vertical direction, a plurality of lines having a plurality of pixels in a horizontal direction, wherein each of the plurality of lines includes an light-shielded area and an effective pixel area that is not light-shielded; and a plurality of output units configured to output a signal from the imaging area, wherein the output units include a plurality of first output units and a plurality of second output units, wherein the first output units are disposed in one side of the imaging area, and wherein the second output units are disposed on another side of the imaging area opposite to the first output units across the imaging area; a first correction unit configured to correct a shading component in the vertical direction that is included in an image signal from the effective pixel area of the plurality of lines, according to a first correction signal from the light-shielded area of the plurality of lines; and a second correction unit configured to correct the image signal output from the first output units according to a common second correction signal, which is in the same line as the image signal and calculated based on the first correction signal output from the first output units, and to correct the image signal output from the second output units according to a common third correction signal, which is in the same line as the image signal and calculated based on the first correction signal output from the second output units, wherein the second correction unit corrects the image signal output from the first correction unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
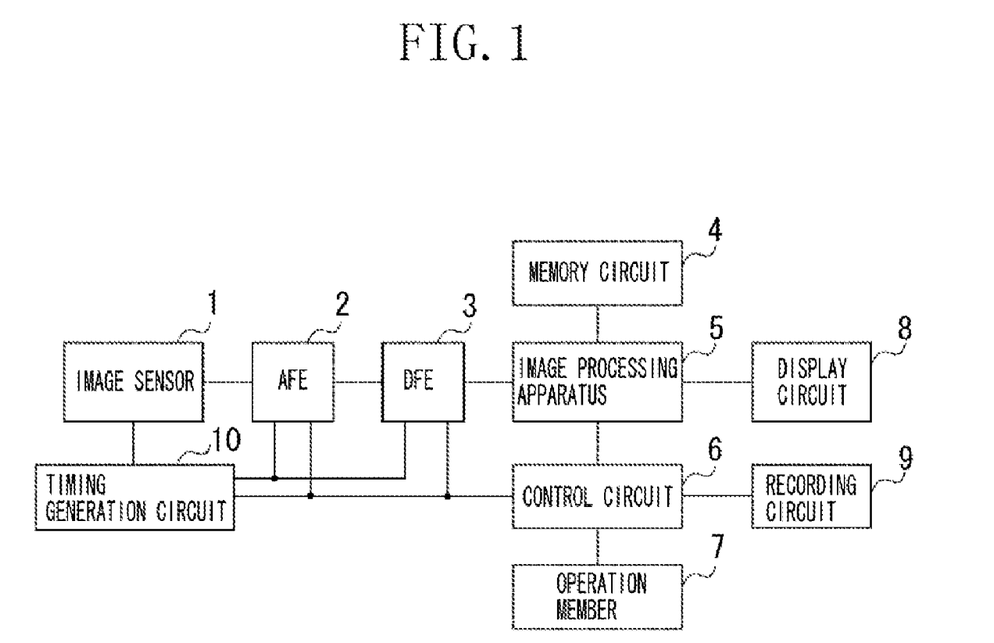
FIG. 1 illustrates an example circuit block of an imaging apparatus according to a first exemplary embodiment and a second exemplary embodiment of the present invention.

FIG. 1 illustrates an example hardware configuration of an imaging apparatus according to a first exemplary embodiment of the present invention. A CMOS image sensor 1 has a configuration similar to that illustrated in FIGS. 8 through 10.

The CMOS image sensor 1 captures an image formed by a photographing lens (not illustrated). The AFE 2 has a configuration illustrated in FIG. 2 as an example.

Figure 2:
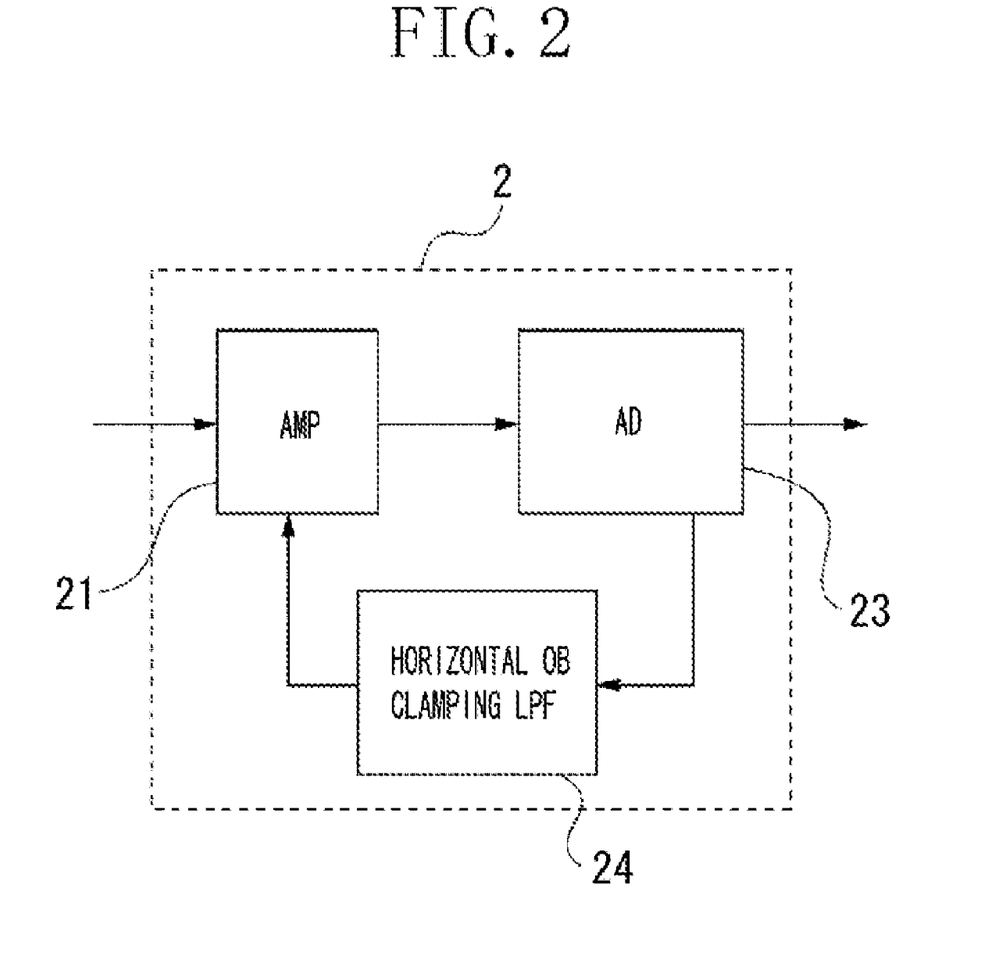
FIG. 2 illustrates an example inner configuration of an AFE according to the first and the second exemplary embodiments of the present invention.

Referring to FIG. 2, a gain control amplifier 21 functions to adjust sensitivity. A horizontal OB clamping circuit 24 clamps an OB value so that the OB level gradually follows an output from an OB area and a value of offset from a black level with respect to each line in the horizontal OB area 71 (see FIG. 9). That is, the horizontal OB clamping circuit 24 corrects a minute and gentle dark shading (a shading in the vertical direction caused by a dark current component). The horizontal OB clamping circuit 24 is set such that a noise from the horizontal OB area 71 and the vertical OB area 72 (see FIG. 9) has no influence on the clamping circuit 24. A result of the correction is fed back to the gain control amplifier 21. The amount of correction is integrated as the correction is performed on subsequent output lines. Thus, the correction amount follows only a gentle variation.

An analog to digital (A/D) conversion circuit 23 converts an analog signal obtained by amplifying, using the gain control amplifier 21 and the horizontal OB clamping circuit 24, the horizontal OB area 71 by a gain according to a black level, into a 14-bit digital signal, for example. The AFE 2 cancels a low frequency component (dark shading) of a dark component.

Now referring to FIG. 1, a DFE 3 receives a digital output of each pixel and digitally corrects an image signal and digitally arranges the pixels. An image processing circuit 5 performs development processing such as white balance correction, matrix conversion, and gamma correction. An image developed by the image processing circuit 5 is then displayed on a display circuit 8 or recorded by a recording circuit 9.

A memory circuit 4 serves as a work memory for development processing in the image processing circuit 5 and also as a buffer memory which is used in the case where imaging processing is serially performed without a break and thus a development unit cannot process all photographed image data in time. An operation member 7 electrically receives a user operation performed via an operation unit of the imaging apparatus (e.g., a digital camera) according to the present exemplary embodiment.

A timing generation circuit 10 generates various timings for driving the CMOS image sensor 1, the AFE 2, and the DFE 3. A control circuit 6 controls each component of the imaging apparatus such as the AFE 2, the DFE 3, the image processing circuit 5, and the timing generation circuit 10.

Figure 3:
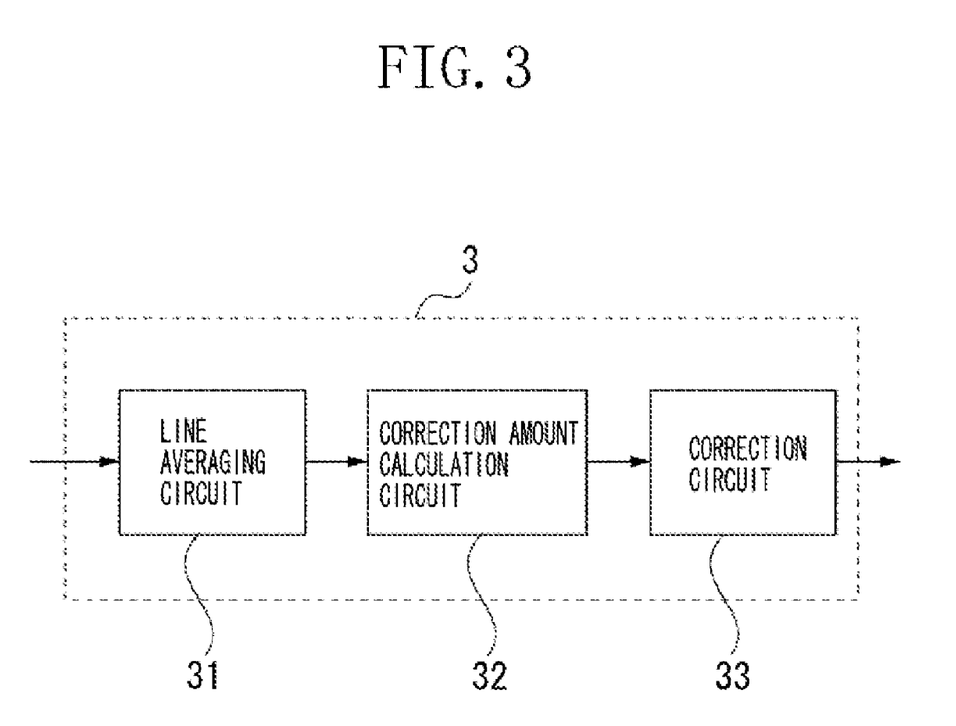
FIG. 3 illustrates an exemplary inner configuration of a digital front end (DFE) according to the first exemplary embodiment of the present invention.

FIG. 3 illustrates an exemplary configuration of the DFE 3 according to the present exemplary embodiment. In FIG. 3, only circuits and portions of the DFE 3 related to the present exemplary embodiment are illustrated.

Referring to FIG. 3, a line averaging circuit 31 averages pixel outputs constituting the horizontal OB area 71, per line. The line averaging circuit 31 performs digital addition averaging processing by setting a start position and an end position on one line in the horizontal OB area 71 on a register (not illustrated). The averaging processing by the line averaging circuit 31 is performed to decrease an effect from random noises on each pixel.

A correction amount calculation circuit 32 subtracts a reference black level, which is determined according to a system type, from an average value calculated by the line averaging circuit 31. Then, the correction amount calculation circuit 32 calculates a value of offset of the average value calculated by the line averaging circuit 31, from the digital value that is the reference black level determined according to the system type.

Furthermore, the correction amount calculation circuit 32 multiplies the calculated offset value by a coefficient (ranging from 0.4 to 0.8), which is determined according to the configuration of the CMOS image sensor, to newly calculate a correction amount. Here, the degree of susceptibility of the effective pixel area to a noise from the power source or other noises is about 0.4 to 0.8. The coefficient is determined based on the degree of susceptibility to a noise. The coefficient differs according to the layout of an image sensor.

A correction circuit 33 subtracts a correction amount calculated by the correction amount calculation circuit 32 from the pixel output of the effective pixel area. Further, it is also noted the above-described operation is performed per line.

The DFE 3 removes a high-frequency dark component (a high-frequency noise on the shading in the vertical direction, which is caused by a dark current component). The above processing is performed by the hardware of the imaging apparatus according to the present invention, as described above. However, the above processing by the DFE 3 can also be performed by software which is installed within the control circuit 6.

In this case, a circuit block similar to that in FIG. 1 is used, except that the circuit block in this case does not include the DFE 3 (FIG. 1). In the case of performing the processing by software in the DFE 3, the software performs processing on image data temporarily stored on the memory circuit 4, since it is difficult to perform noise correction processing at a real time on image data read at a high speed. The image data stored on the memory circuit 4 is read and written via the image processing circuit 5.

Figure 5:
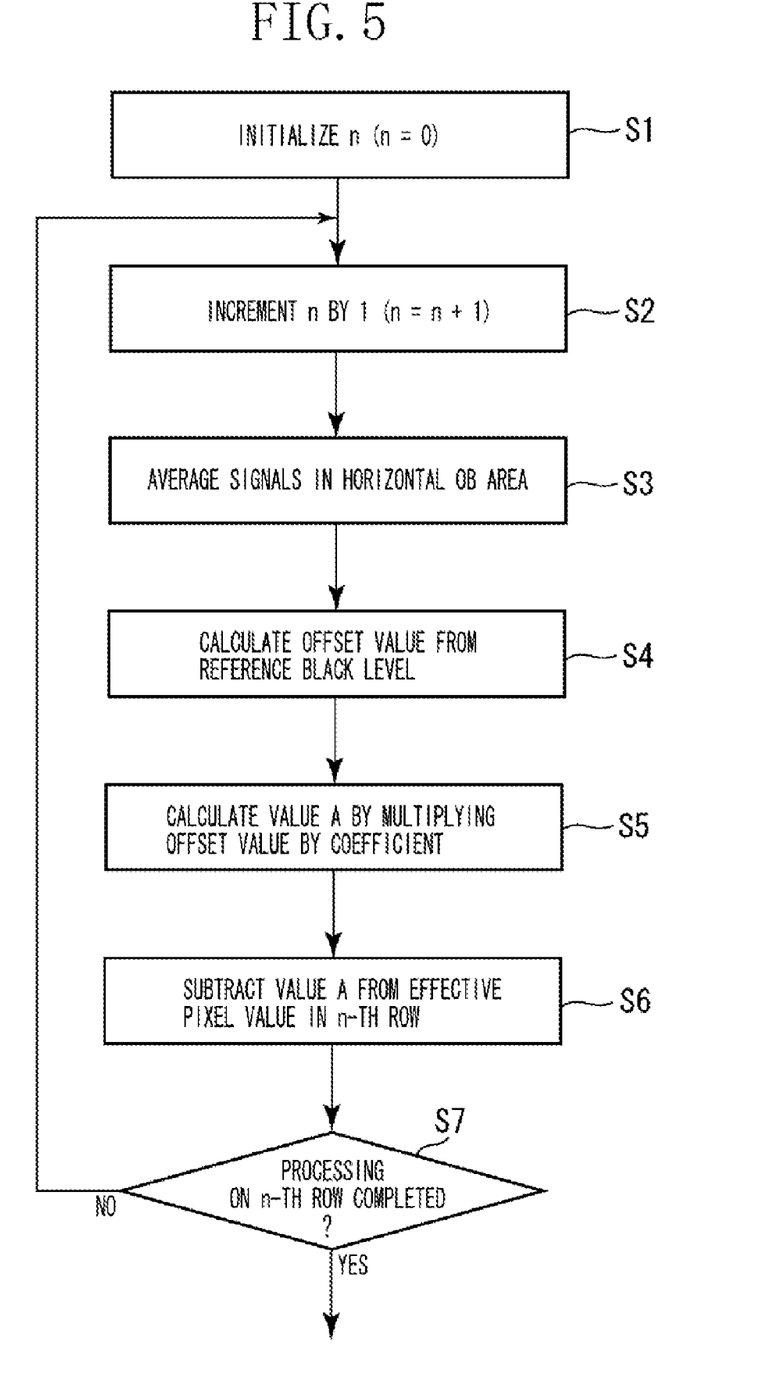
FIG. 5 is a flow chart illustrating correction processing according to the first exemplary embodiment of the present invention.

FIG. 5 is a flow chart illustrating correction processing controlled by the control circuit 6 according to the present exemplary embodiment. In step S1, the control circuit 6 initializes "n", which indicates a row number, to "0". In step S2, the control circuit 6 increments n by 1. In step S3, the control circuit 6 averages a signal output from the OB area of image signals stored on the memory circuit 4. The OB area is a light-shielded pixel of an image signal in an n-th line. By the averaging performed in step S3, influences of random noises and defective pixel can be suppressed.

In step S4, the control circuit 6 calculates a value of offset from a reference black level. In step S5, the control circuit 6 performs calculation by multiplying the offset value calculated in step S4 by a coefficient. The coefficient, which ranges from 0.4 to 0.8, is determined according to the layout of the CMOS image sensor 1.

In step S6, the control circuit 6 subtracts the offset value calculated in step S5 from an effective pixel signal in the same row, and writes the resulting value on the memory circuit 4. In step S7, the control circuit 6 refers to the n-th line to determine whether the noise correction processing has been performed on all the image signals. If an image signal that has not been subjected to the noise correction processing remains (NO in step S7), then the control circuit 6 returns to step S2. On the other hand, if the noise correction processing has been performed on all the image signals (YES in step S7), then, the control circuit 6 advances to subsequent development processing.

Second Exemplary Embodiment

In a second exemplary embodiment of the present invention, the imaging apparatus has a configuration similar to that illustrated in FIG. 1 in the first exemplary embodiment, except that the imaging apparatus according to the second exemplary embodiment has a plurality of channels for output and has the AFE 2 per channel. In addition, the DFE 3 according to the second exemplary embodiment has a configuration different from that in the first exemplary embodiment. Here, the DFE 3 receives a digital output of each pixel and digitally corrects an image signal and digitally arranges the pixels.

Figure 6:
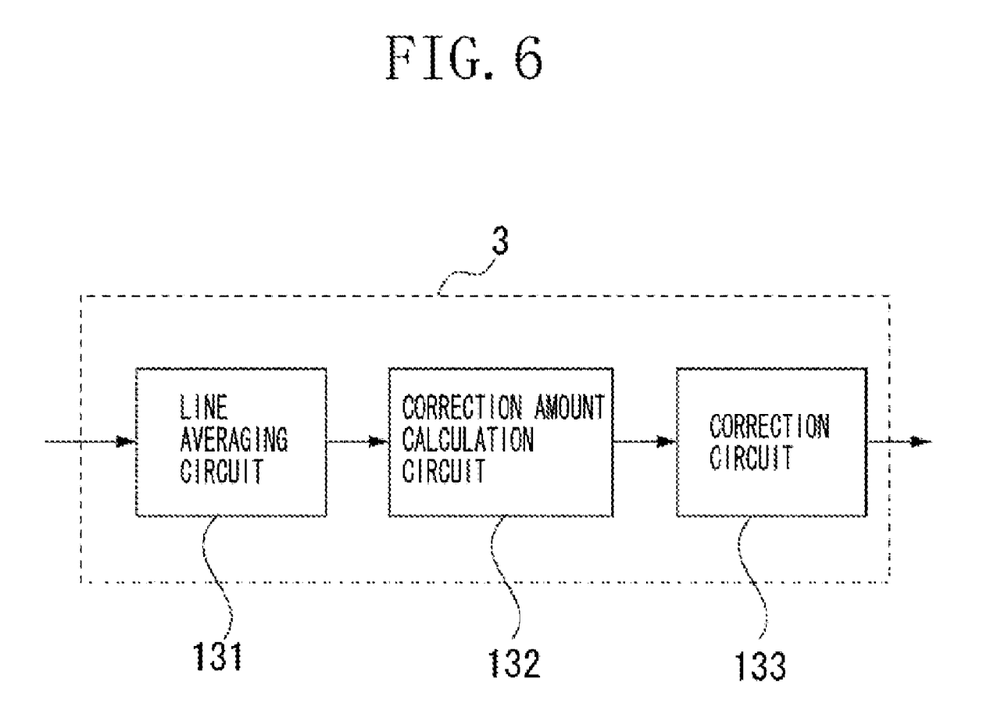
FIG. 6 illustrates an inner configuration of a DFE according to the second exemplary embodiment of the present invention.

FIG. 6 illustrates an inner configuration of the DFE 3 according to the present exemplary embodiment. FIG. 6 illustrates only components of the DFE 3 related to the present exemplary embodiment.

Referring to FIG. 6, a line average circuit 131 averages, per output amplifier (per output from the four amplifiers), the outputs from a predetermined area (in the present exemplary embodiment, pixels in a predetermined area of the horizontal OB area 71) of the CMOS image sensor 1 per horizontal line. The averaging processing by the line average circuit 131 is performed to reduce or suppress an effect from random noises from each pixel, which differs per output path.

A correction amount calculation circuit 132 classifies the data averaged by the line average circuit 131 per output amplifier (per channel) into output path groups. More specifically, the correction amount calculation circuit 132 classifies the data averaged by the line average circuit 131 into an odd-numbered column pixel output path group, which is a path for outputting a pixel output to the upper portion of the CMOS image sensor 1, and an even-numbered column pixel output path group, which is a path for outputting a pixel output to the lower portion of the CMOS image sensor 1. The correction amount calculation circuit 132 averages the data with respect to each group and calculates a correction amount with respect to each group.

In the case of calculating correction data where the data sampled by the line average circuit 131 is multiplied by a coefficient, or in the case of calculating correction data where calculation such as moving averaging in a unit of plural pixels is performed on the data in the vertical direction, the correction amount calculation circuit 132 can perform the above-described calculation.

The correction amount calculation circuit 132 calculates a correction amount for each group of output paths in the upper and the lower portions, as described above. Thus, an amount of data to be held can be smaller than that in the case of storing a correction amount for all the output paths. Accordingly, the amount of data to be held cannot increase even in the case where the CMOS image sensor 1 has five or more output paths.

In addition, according to the present exemplary embodiment, highly accurate correction data can be obtained by multiplying the correction data of an even-numbered column pixel output path group and that of an odd-numbered column pixel output path group by a coefficient (ranging from 0.4 to 0.8), as in the first exemplary embodiment.

A correction circuit 133 corrects a pixel in the effective pixel area according to the correction amount calculated by the correction amount calculation circuit 132. In the present exemplary embodiment, the CMOS image sensor 1 has one DFE 3. Signals from a plurality of AFEs 2 are serially output to the DFE 3.

FIGS. 7A through 7G illustrate an example of variation in the shading occurring before and after the correction of the shading by the imaging apparatus in the vertical direction.

Figure 7A:
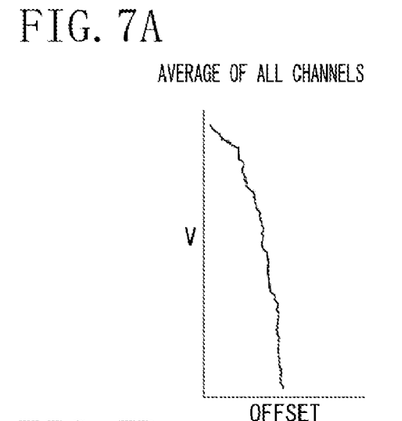
FIGS. 7A through 7G illustrate dark shading in a vertical direction according to the first exemplary embodiment of the present invention.

FIG. 7A illustrates a shading in the vertical direction in the case where the outputs from all the output amplifiers of the CMOS image sensor 1 are averaged.

Figure 7B:
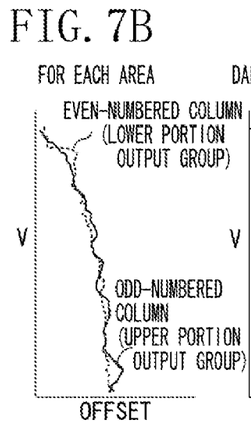

FIG. 7B illustrates a shading in the vertical direction in the case where the outputs are averaged per output path group (an odd-numbered column pixel output path group, which is a path for outputting a pixel output to the upper portion of the CMOS image sensor 1, and an even-numbered column pixel output path group, which is a path for outputting a pixel output to the lower portion of the CMOS image sensor 1) of the CMOS image sensor 1. As is apparent from FIG. 7B, a large noise component appears in the lower portion in the vertical direction with respect to the odd-numbered column pixel output path group. A large noise component appears in the upper portion in the vertical direction with respect to the even-numbered column pixel output path group.

Figure 7C:
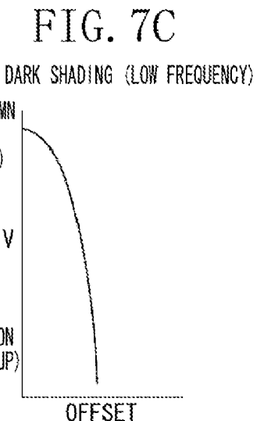

As is apparent from FIGS. 7A and 7B, a gentle shading appears. FIG. 7C illustrates the gently sloped shading as described above, which can be corrected by the horizontal OB clamping circuit 24.

Figure 7D:
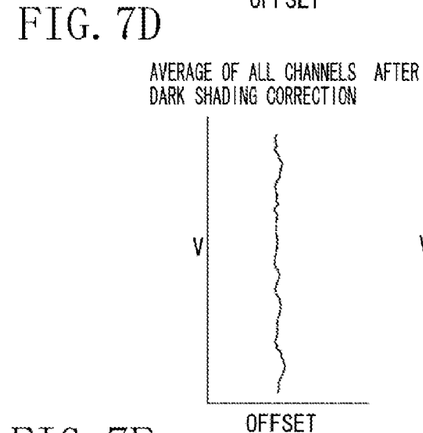

FIG. 7D illustrates a shading appearing in the case where the shading in FIG. 7A is corrected with the correction amount equivalent to that for the shading in FIG. 7C (that is, in the case where the OB level is offset by the horizontal OB clamping circuit 24 to the level around a uniform black level by following the gentle dark shading).

Figure 7E:
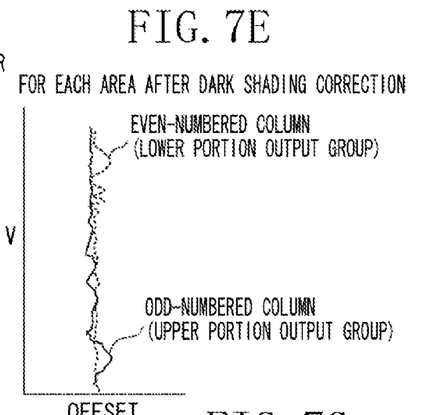

FIG. 7E similarly illustrates a shading per output group (an odd-numbered column pixel output path group, which is a path for outputting a pixel output to the upper portion of the CMOS image sensor 1, and an even-numbered column pixel output path group, which is a path for outputting a pixel output to the lower portion of the CMOS image sensor 1) in the case where the shading in FIG. 7B is corrected with the correction amount equivalent to that for the shading in FIG. 7C

In each of FIGS. 7D and 7E, it is noted the gentle shading is corrected and only the high-frequency noise component remains. And, its is apparent from FIG. 7E, a large noise component appears in the lower portion of the curve in the vertical direction for the odd-numbered column pixel output path group. On the other hand, a large noise component appears in the upper portion of the curve in the vertical direction for the even-numbered column pixel output path group.

The DFE 3 according to the present exemplary embodiment calculates shading data by averaging the high-frequency noise component by forming a group of output paths (that is, the shading data in FIG. 7E) to perform correction in the effective pixel area.

Figure 7F:
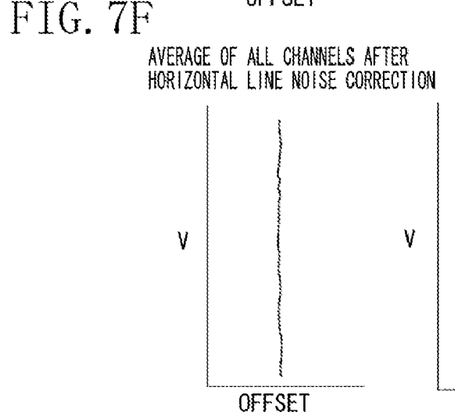
Figure 7G:
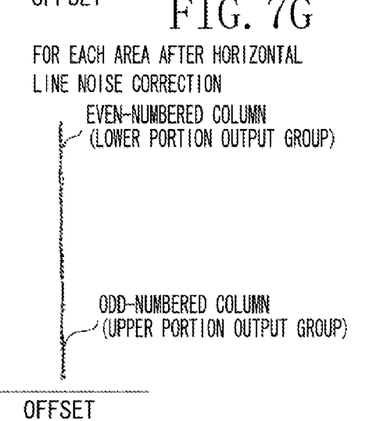

FIG. 7F illustrates a shading in the vertical direction in the case where the outputs from all the output amplifiers are averaged, in a state where the correction on the shading in FIG. 7E by the DFE 3 is completed. FIG. 7G illustrates a shading per output path group in the same state. The output paths are classified into an odd-numbered column pixel output path group, which is a path for outputting a pixel output to the upper portion of the CMOS image sensor 1, and an even-numbered column pixel output path group, which is a path for outputting a pixel output to the lower portion of the CMOS image sensor 1.

As is apparent from FIG. 7G, the DFE 3 corrects the high-frequency noise component remaining in the shading in FIG. 7E per output path group for outputting to the upper or lower portion of the CMOS image sensor 1. Thus, the amount of noise can be sufficiently reduced and the difference in the amounts of noise between the output path groups is reduced to a minimum.

Other Exemplary Embodiments

The present exemplary embodiment is not limited to the shading correction in the case of grouping, which outputs pixels arranged in the same line group to the output amplifiers respectively disposed in the upper and the lower portion of the CMOS image sensor 1 via the vertical output lines that are separately set. For example, the pixels arranged in the same line can be output in the horizontal direction via separately set output lines. In addition, an image sensor that has output amplifiers separately in a left and a right portion of the image sensor, can achieve an effect similar to that described above.

In addition, in the present exemplary embodiment, the DFE 3 determines the correction amount (generates the correction data). However, the present exemplary embodiment is not limited to the DFE 3. For example, the similar effect can be achieved when an AFE generates the correction data or the correction data is generated by calculation performed by software after data is acquired.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-242926 filed Sep. 7, 2006 and Japanese Patent Application No. 2006-242927 filed Sep. 7, 2006, which are hereby incorporated by reference herein in their entirety.

What is claimed is:

1. An imaging apparatus comprising:

an image sensor includes an effective pixel area having a plurality of photo diodes that is not light-shielded, and an optical black pixel area having a plurality of photo diodes that is light-shielded;

an average value calculating unit configured to calculate an average value of optical black signals output from the optical black pixel area;

a correction amount calculation unit configured to calculate an offset value by subtracting a reference black level from the average value, and multiply the offset value by a coefficient which is determined according to a configuration of the image sensor to calculate a correction amount; and a correction unit configured to correct image signals output from the effective pixel area according to the correction amount.

* * * * *